US012669519B2

(12) United States Patent
Anderson et al.

(10) Patent No.: US 12,669,519 B2
(45) Date of Patent: Jun. 30, 2026

(54) AUTOSAMPLER SYSTEM WITH DUAL ROTATIONAL AXIS UNCAPPING

(71) Applicant: Elemental Scientific, Inc., Omaha, NE (US)

(72) Inventors: Matthew R. Anderson, Omaha, NE (US); Jeremiah Meints, Elkhorn, NE (US); Tyler Yost, Omaha, NE (US)

(73) Assignee: ELEMENTAL SCIENTIFIC, INC., Omaha, NE (US)

( * ) Notice: Subject to any disclaimer, the term of this patent is extended or adjusted under 35 U.S.C. 154(b) by 947 days.

(21) Appl. No.: 17/834,331

(22) Filed: Jun. 7, 2022

(65) Prior Publication Data

US 2022/0390477 A1      Dec. 8, 2022

Related U.S. Application Data

(60) Provisional application No. 63/208,302, filed on Jun. 8, 2021.

(51) Int. Cl.
G01N 35/00 (2006.01)
G01N 35/04 (2006.01)
(Continued)

(52) U.S. Cl.
CPC ......... G01N 35/0099 (2013.01); G01N 35/04 (2013.01); G01N 35/10 (2013.01); (Continued)

(58) Field of Classification Search
CPC ............................................. G01N 2035/0405
See application file for complete search history.

(56) References Cited

U.S. PATENT DOCUMENTS

| | | | | |
|---|---|---|---|---|
| 7,972,579 B2* | 7/2011 | Brunner | ................... | B01L 9/06 |
| | | | | 422/561 |
| 9,134,332 B2* | 9/2015 | Frey | .................. | G01N 35/0099 |

(Continued)

FOREIGN PATENT DOCUMENTS

| | | |
|---|---|---|
| CN | 112540184 A | 3/2021 |
| CN | 213337671 U | 6/2021 |

(Continued)

OTHER PUBLICATIONS

International Search Report and Written Opinion for Application No. PCT/US2022/032502, dated Sep. 29, 2022.

(Continued)

*Primary Examiner* — Jill A Warden
(74) *Attorney, Agent, or Firm* — Kevin E. West; Advent, LLP

(57) ABSTRACT

Systems and methods for automated cap removal with an autosampler system are described. In an aspect, an autosampler system includes, but is not limited to, a sample rack; a sample vessel stabilizer configured to transition the sample rack between a load/unload state and a lock state; an uncapper supported by a first z-axis support; and a sample probe supported by a second z-axis support, wherein the uncapper is configured to remove a cap from a sample vessel held by the sample rack when the sample rack is in the lock state, and wherein the uncapper is configured to change the position of the removed cap to permit access to an interior of the sample vessel by the sample probe without removing the sample vessel from the sample rack.

17 Claims, 10 Drawing Sheets

(51) Int. Cl.
 *G01N 35/10* (2006.01)
 *B01L 3/00* (2006.01)

(52) U.S. Cl.
 CPC *B01L 3/50825* (2013.01); *G01N 2035/00059*
  (2013.01); *G01N 2035/00287* (2013.01); *G01N*
   *2035/0405* (2013.01); *G01N 2035/0441*
    (2013.01)

(56) References Cited

U.S. PATENT DOCUMENTS

| | | | |
|---|---|---|---|
| 9,523,700 | B1 | 12/2016 | Yost et al. |
| 10,335,792 | B2 | 7/2019 | Nuotio et al. |
| 10,514,329 | B1 | 12/2019 | Toms |
| 2008/0170967 | A1 | 7/2008 | Itoh |
| 2008/0247914 | A1 | 10/2008 | Edens et al. |
| 2010/0043211 | A1 | 2/2010 | Pedrazzini |
| 2020/0355711 | A1 | 11/2020 | Wiederin et al. |
| 2021/0293835 | A1 | 9/2021 | Marth |

FOREIGN PATENT DOCUMENTS

| | | | | |
|---|---|---|---|---|
| EP | 3259071 | B1 | 2/2019 | |
| EP | 3798639 | A1 | 3/2021 | |
| TW | I461690 | B | 11/2014 | |
| WO | WO-2009033128 | A2 * | 3/2009 | ......... G01N 35/0099 |
| WO | 2021088183 | A1 | 5/2021 | |

OTHER PUBLICATIONS

Office Action in Taiwan for Patent Application No. 111121322 dated
Feb. 23, 2026.

* cited by examiner

AUTOSAMPLER SYSTEM WITH DUAL ROTATIONAL AXIS UNCAPPING

CROSS-REFERENCE TO RELATED APPLICATIONS

The present application claims the benefit of 35 U.S.C. § 119(e) of U.S. Provisional Application Ser. No. 63/208,302, filed Jun. 8, 2021, and titled "AUTOSAMPLER SYSTEM WITH DUAL ROTATIONAL AXIS UNCAPPING." U.S. Provisional Application Ser. No. 63/208,302 is herein incorporated by reference in its entirety.

BACKGROUND

In many laboratory settings, it is often necessary to analyze a large number of chemical or biochemical samples at one time. In order to stream-line such processes, the manipulation of samples has been mechanized. Such mechanized sampling is commonly referred to as autosampling and is performed using an automated sampling device or autosampler.

SUMMARY

Systems and methods for automated cap removal with an autosampler system are described. In an aspect, an autosampler system includes, but is not limited to, a sample rack; a sample vessel stabilizer configured to transition the sample rack between a load/unload state and a lock state; an uncapper supported by a first z-axis support; and a sample probe supported by a second z-axis support, wherein the uncapper is configured to remove a cap from a sample vessel held by the sample rack when the sample rack is in the lock state, and wherein the uncapper is configured to change the position of the removed cap to permit access to an interior of the sample vessel by the sample probe without removing the sample vessel from the sample rack.

In an aspect, an autosampler system includes, but is not limited to, a sample rack; a sample vessel stabilizer configured to transition the sample rack between a load/unload state and a lock state; an uncapper supported by a first z-axis support, the uncapper including an uncapper body and a cap interface rotationally coupled to the uncapper body, the uncapper body coupled to the first z-axis support; a sample probe supported by a second z-axis support; and a motor system configured to provide at least rotational motion and translation motion to each of the first z-axis support and the second z-axis support, wherein the uncapper is configured to remove a cap from a sample vessel held by the sample rack via interaction between the cap interface and the cap when the sample rack is in the lock state, and wherein the uncapper is configured to change the position of the removed cap via rotational motion of the uncapper body to permit access to an interior of the sample vessel by the sample probe without removing the sample vessel from the sample rack.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 1:
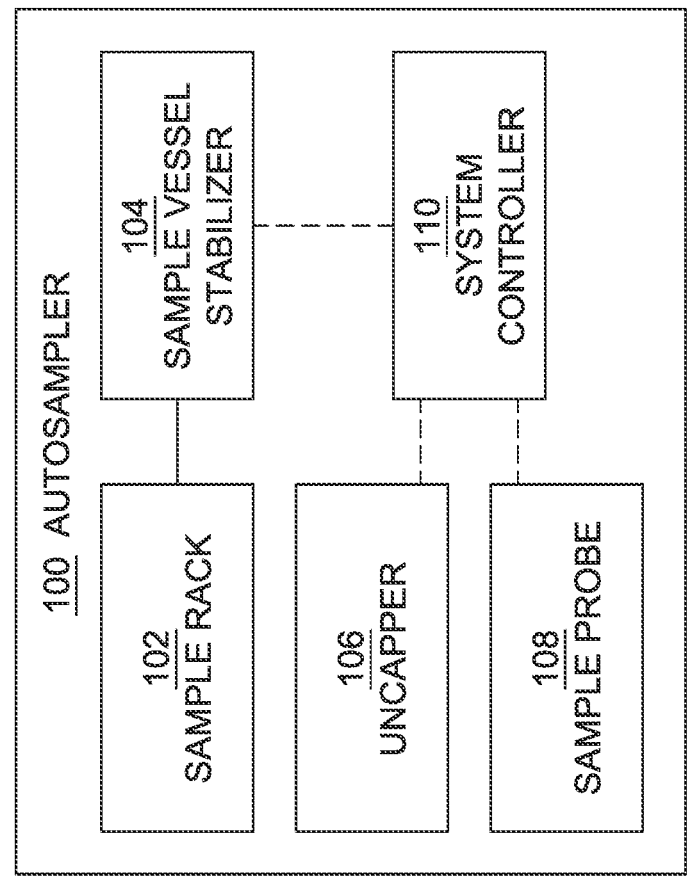
FIG. 1 is a diagrammatic view of an autosampler system for automated cap removal with dual rotational axis uncapping and sample preparation in accordance with an example embodiment of the present disclosure.
Figure 2A:
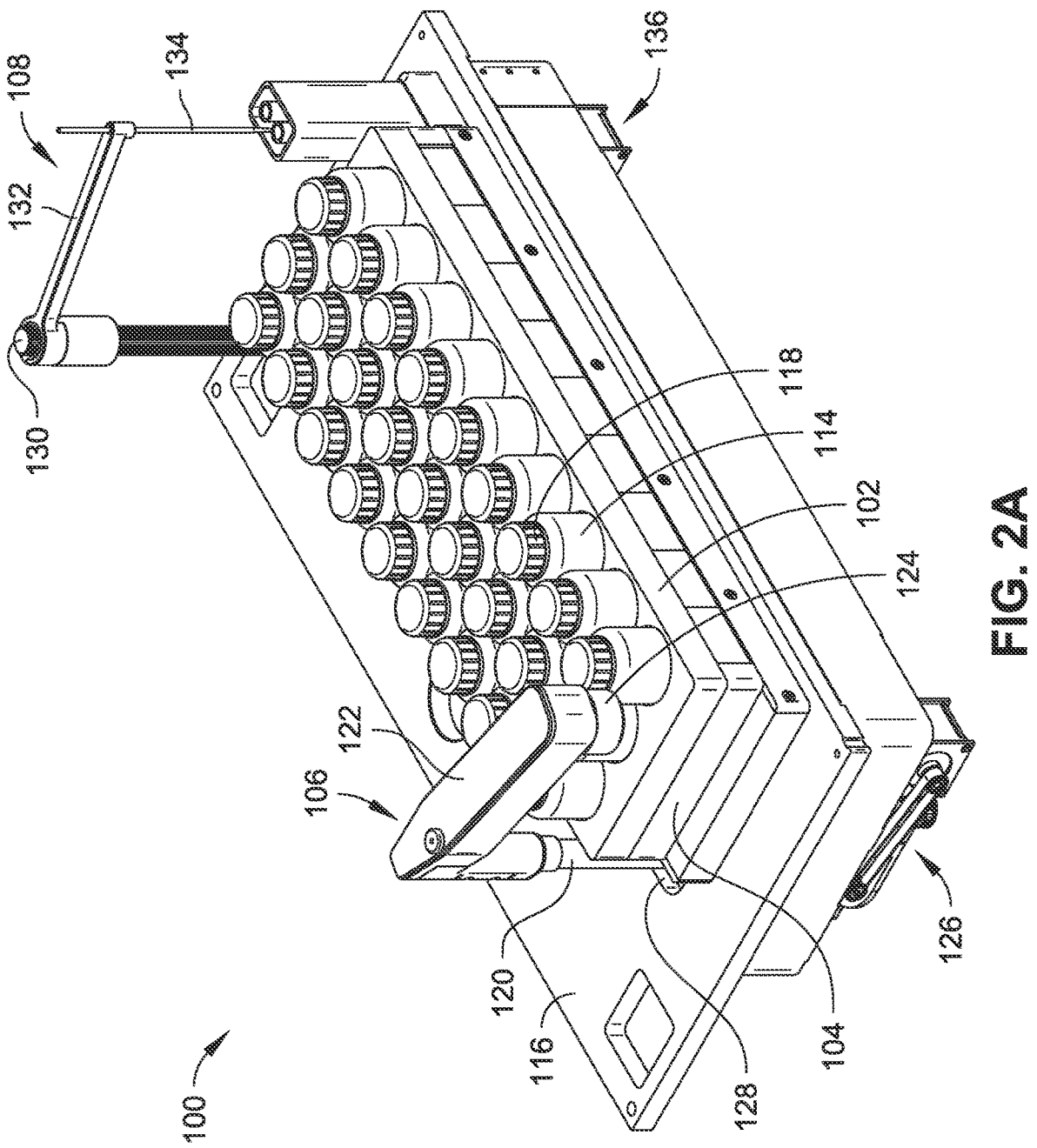
FIG. 2A is an isometric view of an autosampler system for automated cap removal with dual rotational axis uncapping and sample preparation in accordance with an example embodiment of the present disclosure.
Figure 2B:
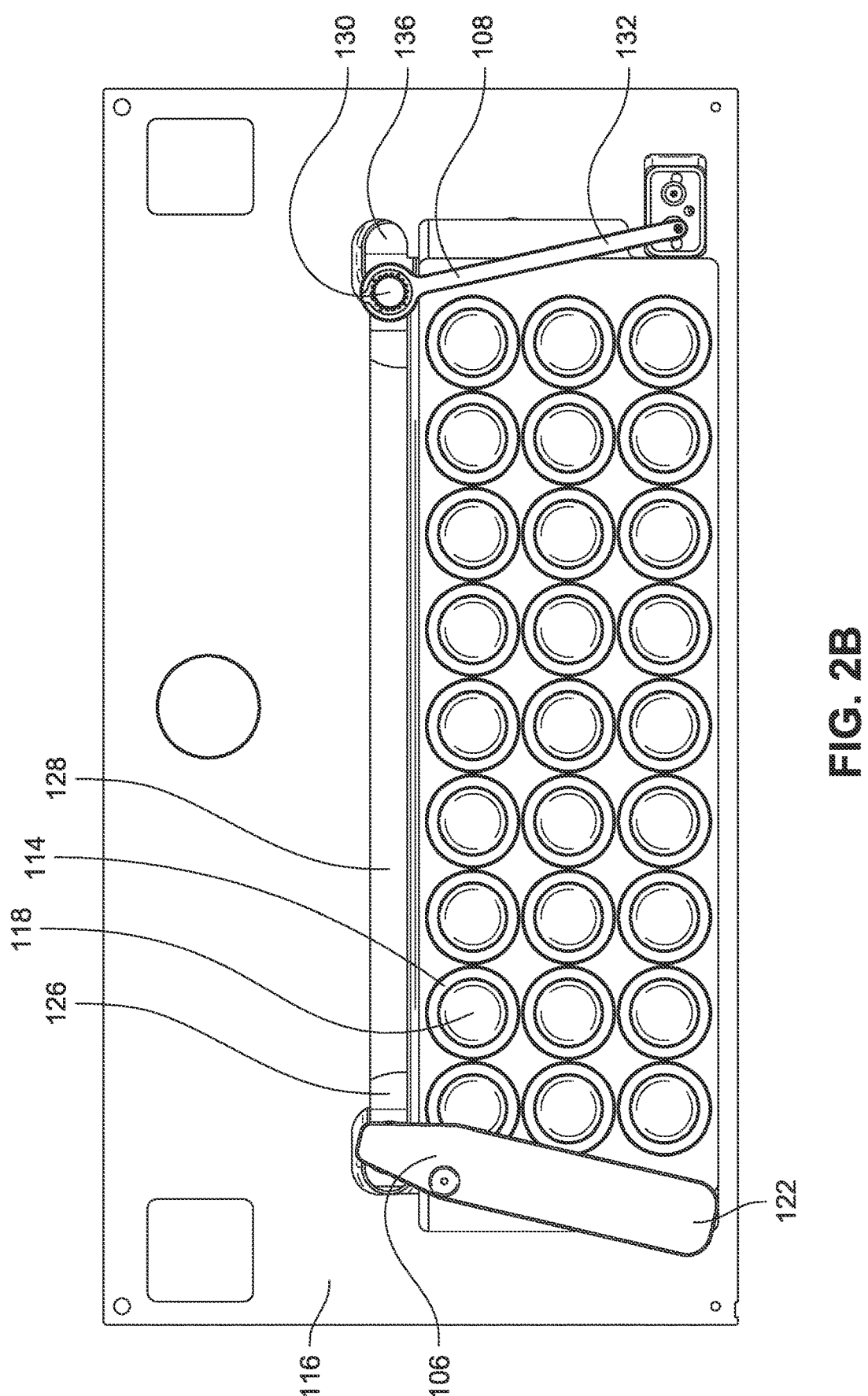
FIG. 2B is a partial top plan view of the autosampler system of FIG. 2A.

An automated sampling device, or autosampler, can support a sample probe relative to a vertically-oriented rod which moves the sample probe along or across one or more directions of movement. For instance, the sample probe can be coupled to a vertically-moveable portion of the rod by a probe support arm or other device to move the probe in a vertical direction, such as to position the probe into and out of sample vessels (e.g., tubes or other containers), rinse vessels, standard chemical vessels, diluent vessels, and the like, on a deck of the autosampler. In other situations, the rod can be rotated to facilitate movement of the probe about a horizontal plane, such as to position the probe above other sample vessels and other vessels positioned on the deck.

Sample vessels positioned on the deck can be supported by sample racks or sample holders to position the sample vessels in discrete positions for access by the sample probe. The sample vessels can be covered by a cap, lid, septum, or other structure to prevent external contamination of the sample held within the sample vessel, to prevent portions of the sample from evaporating or otherwise leaving the sample vessel, to provide separation between nearby individuals (e.g., laboratory staff) and potentially hazardous materials contained in the sample vessels, and the like. In order for the sample probe to interact with samples contained within sealed sample vessels, the sealing device (e.g., cap, lid, septum, etc.) can be removed or pierced by the sample probe. For example, automated cap removal systems remove a sealed sample vessel from a sample rack and reposition the sealed sample vessel in an uncapping station remote from the sample rack to remove the cap or other seal. The exposed sample vessel can then be returned to the sample rack or to a different sample rack to add or remove substances from the sample vessel. Each time the sealed or unsealed sample vessel is moved, the risk of analytical error or safety concern increases. For example, the sample vessel could be moved to an erroneous sample rack, could be mislabeled, could have erroneous substances added to the sample vessel, could be contaminated by an environmental contaminant, could expose potentially hazardous materials to nearby individuals, and the like.

Accordingly, systems and methods are disclosed for auto-mated cap removal with an autosampler system. In an aspect, an autosampler system includes a sample vessel support structure having a sample vessel stabilizer having a lock state to lock sample vessels in place at the autosampler system and a load/unload state to permit introduction or removal of sample vessels from the sample vessel support structure. The autosampler system also includes an uncapper and a sample probe support that are positioned to access sample vessels held in the sample vessel support structure. The uncapper is configured to remove a cap, lid, or other seal from the sample vessels when the sample vessel stabilizer is in the locked state to provide cap removal without removing the sample vessel for transport to a separate uncapping station. When the cap is removed, the sample probe support can move a sample probe into position within or above the sample vessel to add or remove substances from the sample vessel, such as while the sample vessel remains in the same position in the sample vessel support as when the uncapper interacted with the sample vessel. In implementations, uncapper and the sample probe support are coupled to separate vertical supports that provide one or more of rotational, lateral, and vertical movement of the respective structures. In implementations, the separate vertical supports are moved via separate motor carriages with a common rail system that moves the vertical supports through a common channel formed through a deck of the autosampler system.

Example Implementations

Referring to FIGS. 1A through 7B, an autosampler system ("system 100") for automated cap removal and sample probe introduction is shown in accordance with example embodi-ments of the present disclosure. The system 100 generally includes a sample rack 102, a sample vessel stabilizer 104, an uncapper 106, a sample probe 108, and a system con-troller 110. The sample rack 102 defines a plurality of apertures 112 (e.g., shown in FIGS. 6A and 6B) to receive a plurality of sample vessels 114 into respective apertures 112. The sample rack 102 provides a stable platform to support the sample vessels 114 on a deck 116 of the system 100, accessible to each of the uncapper 106 and the sample probe 108. The sample vessels 114 can include, but are not limited to, test tubes, vials, bottles, and other containers to hold solids, liquids, fluids, and other sample materials. For example, the samples vessels 114 are shown in FIG. 1 as sample bottles having corresponding caps 118 that rotatably secure to the bottles, such as through complementary thread-ing or other securing structure. However, the system 100 is not limited to cap and bottle configurations of sample vessels 114 and can support a variety of configurations of sample vessels 114.

The uncapper 106 generally includes a z-axis support 120, an uncapper body 122, and a cap interface 124. The z-axis support 120 provides rotational, translational, and vertical movement of the uncapper body 122 with respect to the deck 116 of the system 100. In implementations, the z-axis support 120 is driven via a first carriage 126 which provides vertical and rotational motion of the z-axis support 120 and also provides translational motion of the z-axis support 120 through a channel 128 formed through the deck 116 of the system 100. The uncapper body 122 is coupled to each of the z-axis support 120 and the cap interface 124, such that motion of the z-axis support 120 is translated to each of the uncapper body 122 and the cap interface 124 to position the cap interface 124 relative to caps 118 of sample vessels 114 held by the sample rack 102. The sample probe 108 gener-ally includes a z-axis support 130, a probe support arm 132, and a probe 134. In implementations, the z-axis support 130 is driven via a second carriage 136 which provides vertical and rotational motion of the z-axis support 130 and also provides translational motion of the z-axis support 130 through the channel 128 formed through the deck 116 of the system 100. The probe support arm 132 is coupled to each of the z-axis support 130 and the probe 134, such that motion of the z-axis support 130 is translated to each of the probe support arm 132 and the probe 134 to position the probe 134 relative to sample vessels 114 held by the sample rack 102 (e.g., to introduce fluids to, or remove fluids from, an interior of the sample vessels 114 once the cap 118 is removed by the uncapper 106) to position the probe 134 at a rinse station or other portion of the system 100, and the like. Example implementations of the carriage-driven z-axis supports 120 and 130 are provided in U.S. Patent Application Ser. Nos. 14/525,531 and 17/208,136, each of which is incorporated herein by reference in its entirety.

Figure 3:
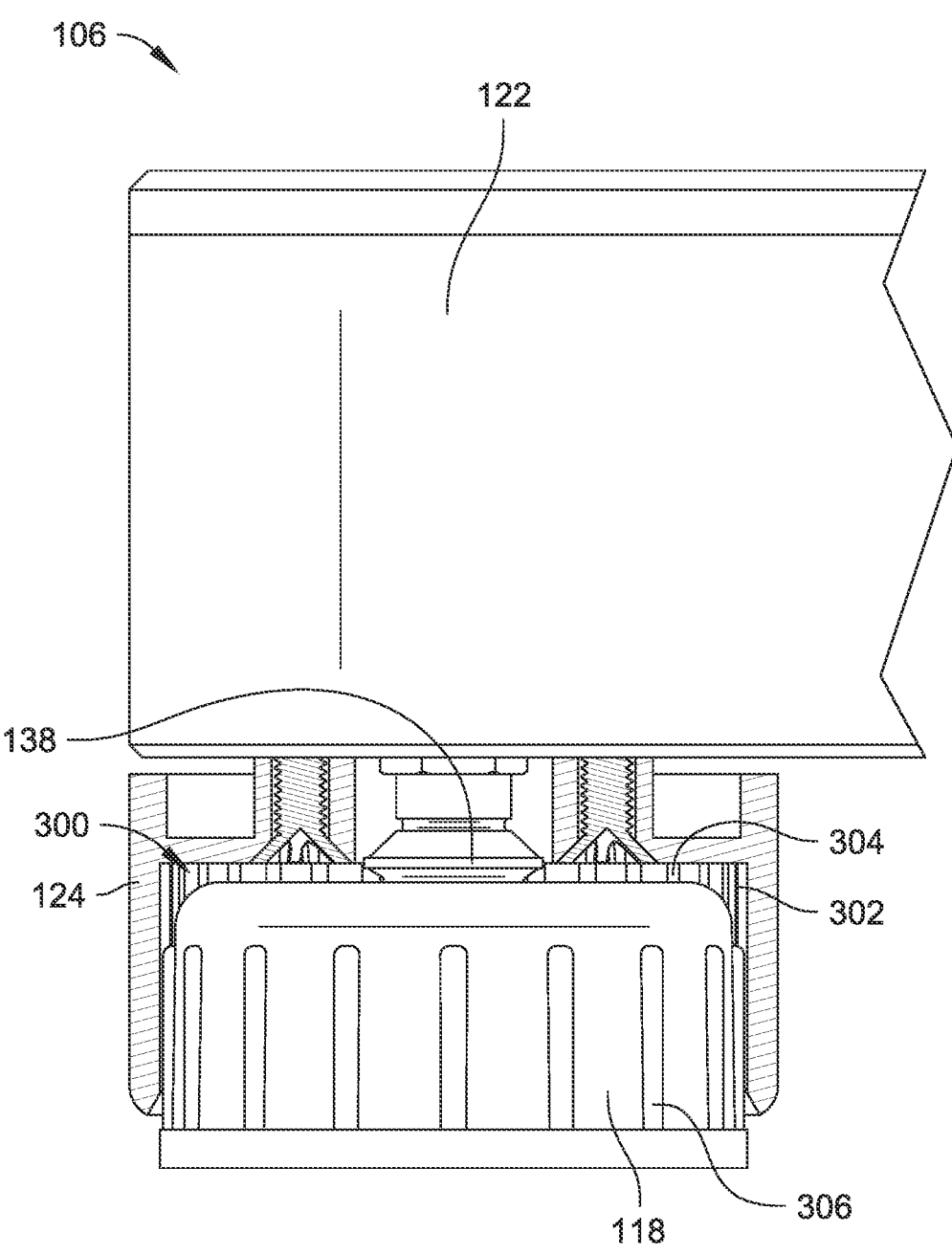
FIG. 3 is a partial side view of an uncapper of the autosampler system of FIG. 2A, shown interacting with a cap of a sample vessel.
Figure 4:
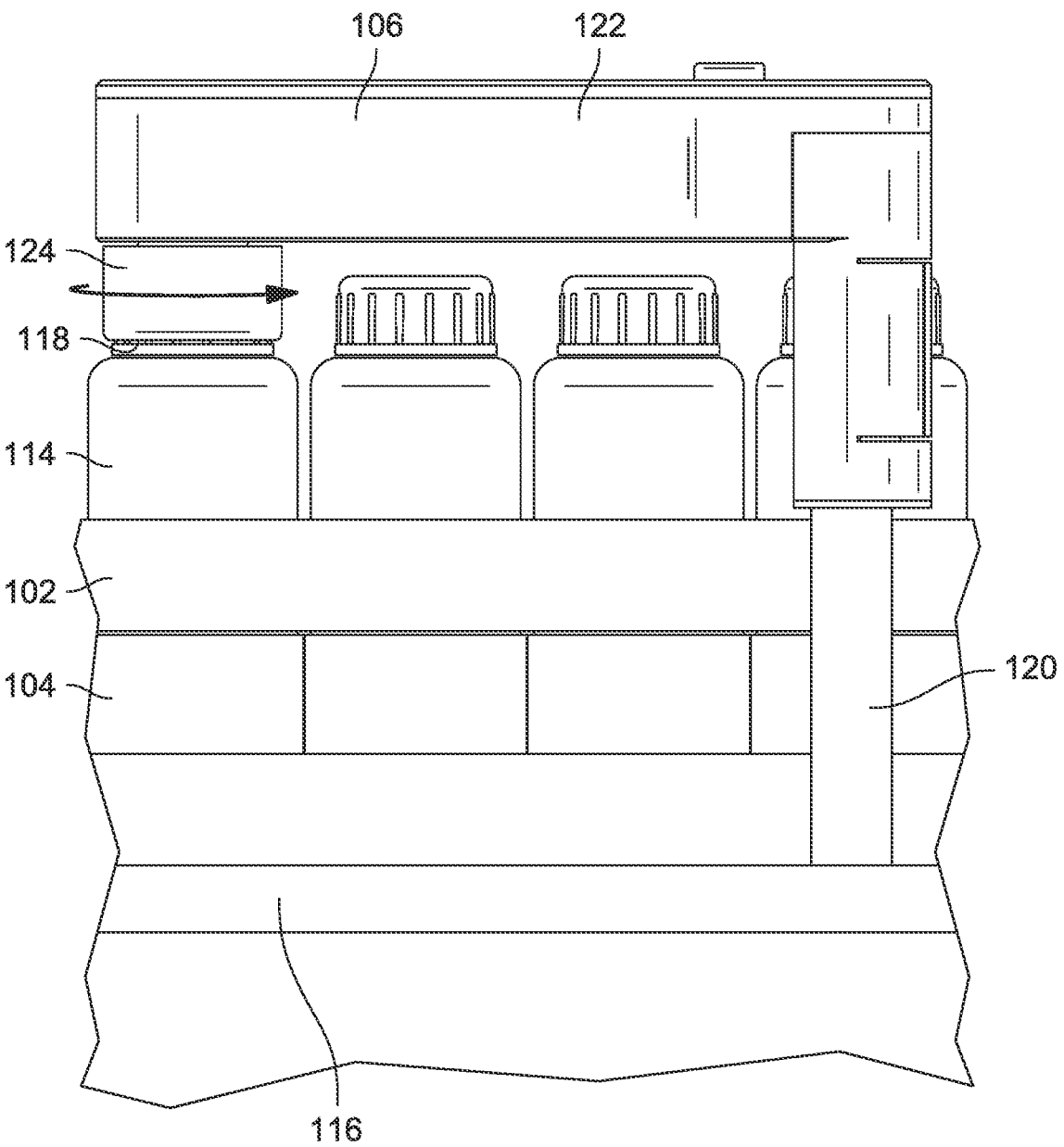
FIG. 4 is a partial side view of an uncapper of the autosampler system of FIG. 2A, shown rotating the cap of the sample vessel in a sample rack in accordance with an example embodiment of the present disclosure.
Figure 5:
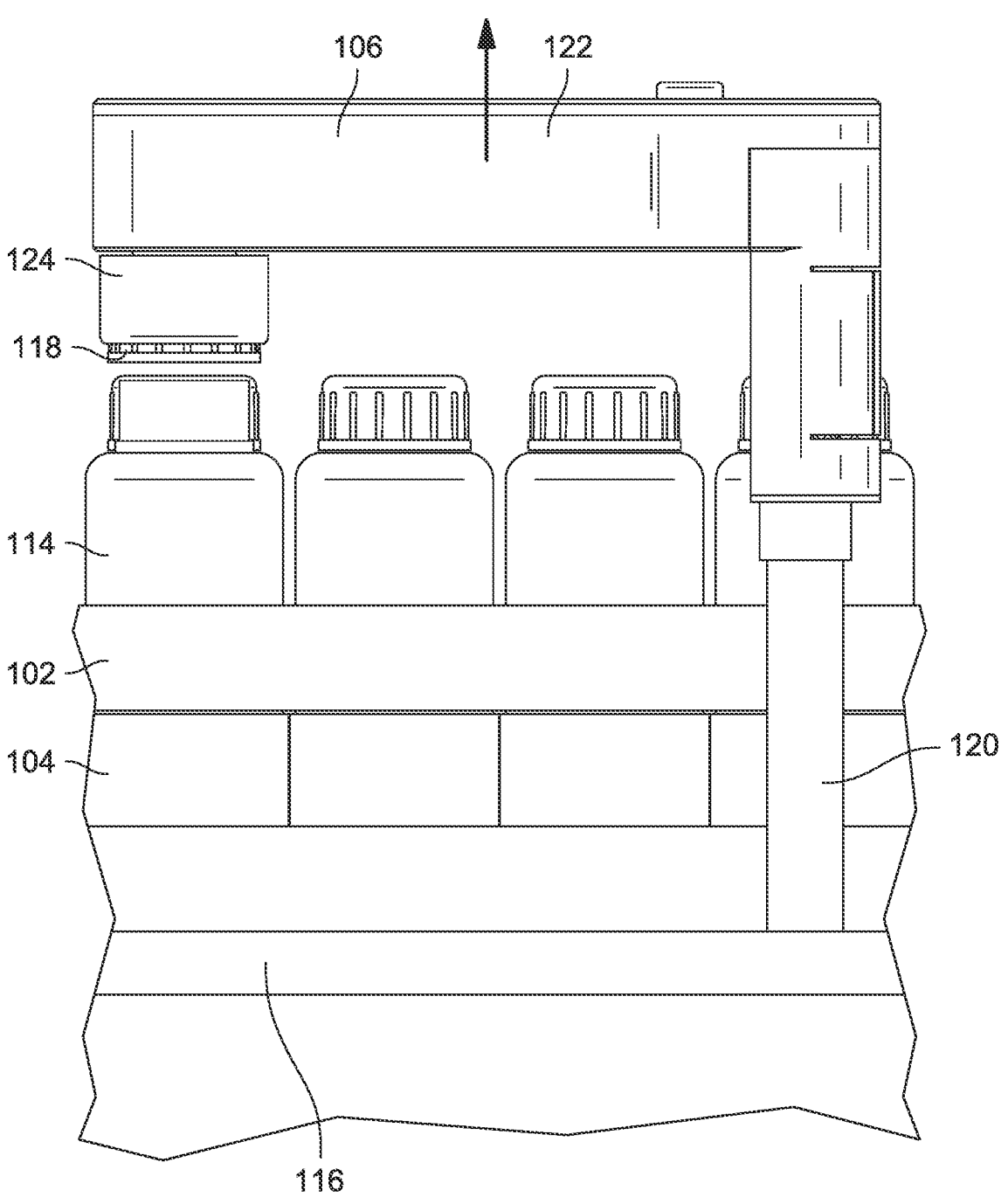
FIG. 5 is a partial side view of an uncapper of the autosampler system of FIG. 2A, shown lifting the cap from the sample vessel in the sample rack.

Referring to FIGS. 3-5, a procedure for removing a cap 118 from a sample vessel 114 via the uncapper 106 is shown in in accordance with example embodiments. The system 100 positions the z-axis support 120 to bring the cap interface 124 above the desired sample vessel 114 and lowers the cap interface 124 (e.g., via lowering the uncapper body 122 along the z-axis support 120) into proximity with the cap 118 of the desired sample vessel 114. For example, the system controller 110 can access a sample schedule to determine which bottle contains the next sample for analysis and position the cap interface 124 above the sample vessel 114 holding the next sample (e.g., via indexing or other positioning system). In implementations, the cap interface 124 defines an interior region 300 into which at least a portion of the cap 118 fits to provide physical interaction between an interior surface 302 of the interior region 300 and an exterior surface of the cap 118. For example, the cap interface 124 can include one or more protrusions, ridges, surface features or the like extending from or forming a portion of the interior surface 302 that correspond to or physically interact with an outer surface of the cap 118, one or more protrusions, ridges, surface features or the like of the cap 118, and combinations thereof. For instance, FIG. 3 shows the interior surface 302 of the cap interface 124 including protrusions 304 positioned to interface with pro-trusions 306 on an exterior surface of the cap 118, such that rotation of the cap interface 124 causes the protrusions 304 to physically contact the protrusions 306 to correspondingly rotate the cap 118.

In implementations, the uncapper body 122 houses a motor to provide rotation of the cap interface 124, where rotation of the cap interface 124 provides a corresponding rotation of the cap 118 to loosen the cap 118 relative to the sample vessel 114 or to tighten the cap 118 relative to the sample vessel 114. A user can set a maximum torque value to be applied to the cap 118 (e.g., via a user interface communicatively coupled with the system controller 110) to prevent rotation of the cap 118 upon achieving a torque that meets or exceeds the maximum torque value. For example, the system 100 can include a torque sensor (e.g., coupled to the uncapper 106) to monitor the torque applied to the cap 118, where upon sensing a torque that meets or exceeds the maximum torque value, the system 100 ceases rotation of the cap interface 124 (e.g., to prevent damage to the sample vessel 114, the cap 118, etc.).

In implementations, the uncapper 102 includes a vacuum structure 138 positioned within the cap interface 124 to draw a vacuum against the cap 118 to hold the loose cap 118 within the cap interface 124. For example, the vacuum structure 138 can hold a loose cap 118 (e.g., following rotational loosening of the cap 118 by rotation of the cap interface 124) within the cap interface 124 during an upward motion of the uncapper 106 (e.g., shown in FIG. 5) to remove the cap 118 from the sample vessel 114. The uncapper 106 can then position the removed cap 118 away from the sample vessel 114 to provide access to the interior of the sample vessel 114 by the sample probe 108. For example, the z-axis support 120 can rotate the uncapper body 122 away from a vertical axis of the sample vessel 114 to position the removed cap 118 away from an opening in the sample vessel 114 to permit the sample probe 108 to be introduced to an interior of the sample vessel 114 without obstruction by the cap 118.

In implementations, the uncapper 106 includes a vacuum sensor configured to register the presence of the cap 118 relative to the cap interface 124, the absence of the cap 118 relative to the cap interface 124, or combinations thereof. The vacuum sensor can generate a sense signal to indicate the presence or absence of the cap 118 to provide information to the system 100 regarding a status of the cap 118 (e.g., tightened, loosened, in place on the sample vessel 114, vertically positioned above the sample vessel 114, rotated or otherwise positioned away from the sample vessel 114, etc.). For example, the sense signal can be sent to the system controller 110 to control aspects of the system 100 based upon the status of the cap 118, such as to trigger movement of the sample probe 108 upon availability of the interior of the sample vessel 114. In implementations, the vacuum sensor is integrated with the vacuum structure 138 to detect whether the cap interface 124 is in position above the cap 118, is contacting the cap 118, is drawing a vacuum against the cap 118, or the like.

The system 100 includes the sample vessel stabilizer 104 to control loading, unloading, and locking of sample vessels 114 within the sample rack 102. In implementations, the sample rack includes the sample vessel stabilizer 104 to transition the sample rack between a lock state to lock sample vessels 114 in place within the apertures 112 of the sample rack 102 and a load/unload state to permit introduction or removal of sample vessels 114 from the sample rack 102. For example, when in the lock state, the sample vessel 114 is secured within the sample rack 102 such that uncapper 106 can rotate the cap interface 124 to loosen and remove the cap 118 from the locked sample vessel 114 (e.g., with substantial rotation of the sample vessel 114 within the aperture 112). In implementations, the sample vessel stabilizer 104 includes a structure that is driven between the lock state and the load/unload state, such as through operation of a pneumatic piston, an electric drive, or other powered structure.

Implementations of the sample vessel stabilizer 104 are shown in FIGS. 6A through 7B. The sample vessel stabilizer 104 can include a slidable support structure 140 that slides between a first position (e.g., shown in FIG. 6A) to provide the load/unload state of the sample vessel stabilizer 104 and a second position (e.g., shown in FIG. 6B) to provide the lock state of the sample vessel stabilizer 104. The slidable support structure 140 can be slid laterally across a width of the sample vessel stabilizer 104, longitudinally across a length of the sample vessel stabilizer 104, across a different orientation, or combinations thereof. In implementations, the slidable support structure 140 includes a plurality of apertures that correspond to the apertures 112 in the sample rack 102 such that when in the first position, the apertures of the slidable support structure 140 overlap with the apertures 112 in the sample rack 102 to provide vertical access of the sample vessels 114 through each aperture to introduce to, or remove the sample vessel 114 from, the sample rack 102. When in the second position, the apertures of the slidable support structure 140 are partially offset from the apertures 112 in the sample rack 102 to restrict vertical and rotational movement of the sample vessels 114 through friction interference between the slidable support structure 140, the sample vessel 114, and the sample rack 102. For instance, the slidable support structure 140 can push the sample vessel 114 against the sample rack 102 to provide the friction interference.

Figure 6A:
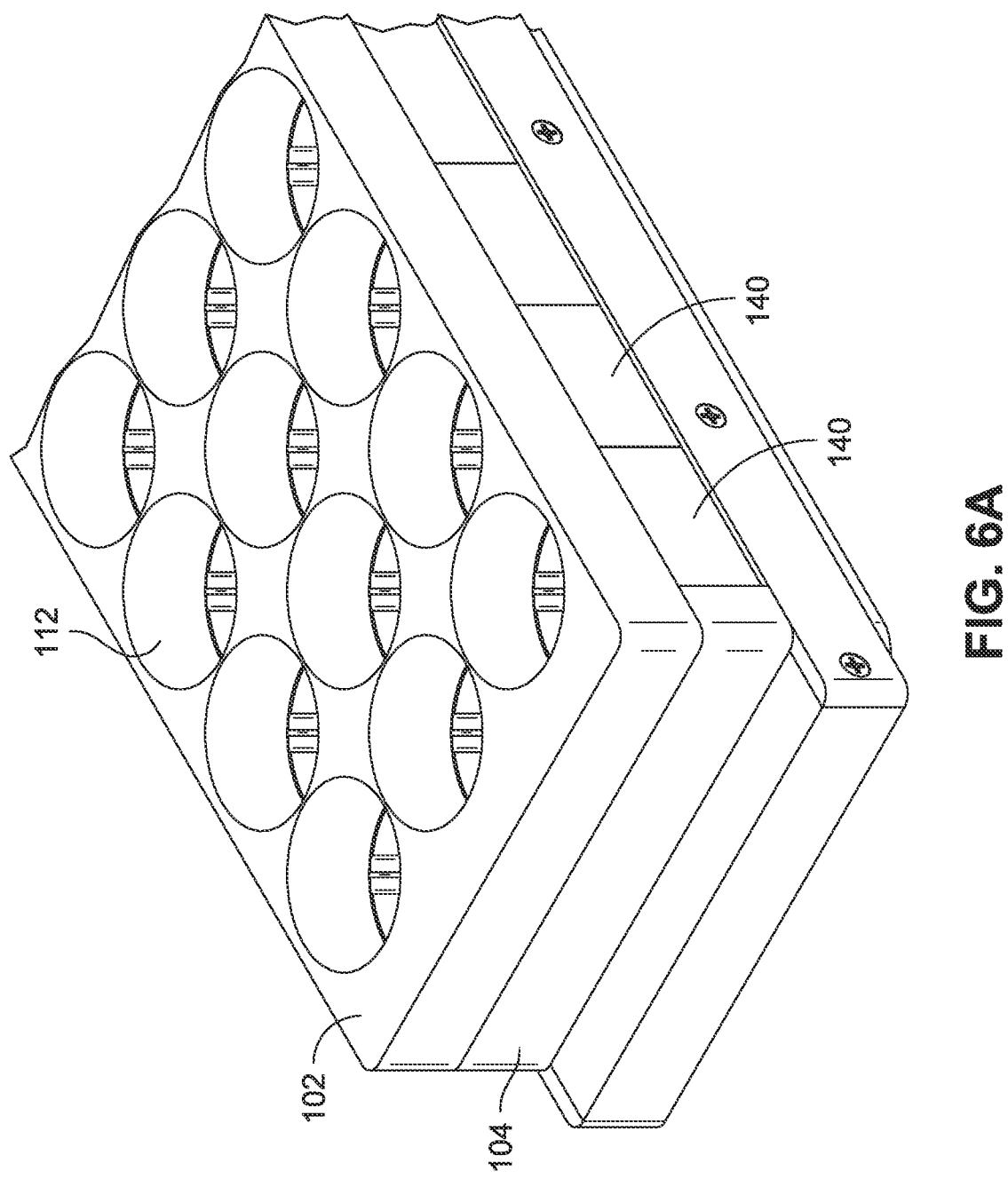
FIG. 6A is an isometric view of a sample rack with a sample vessel stabilizer in a load/unload orientation in accordance with an example embodiment of the present disclosure.
Figure 6B:
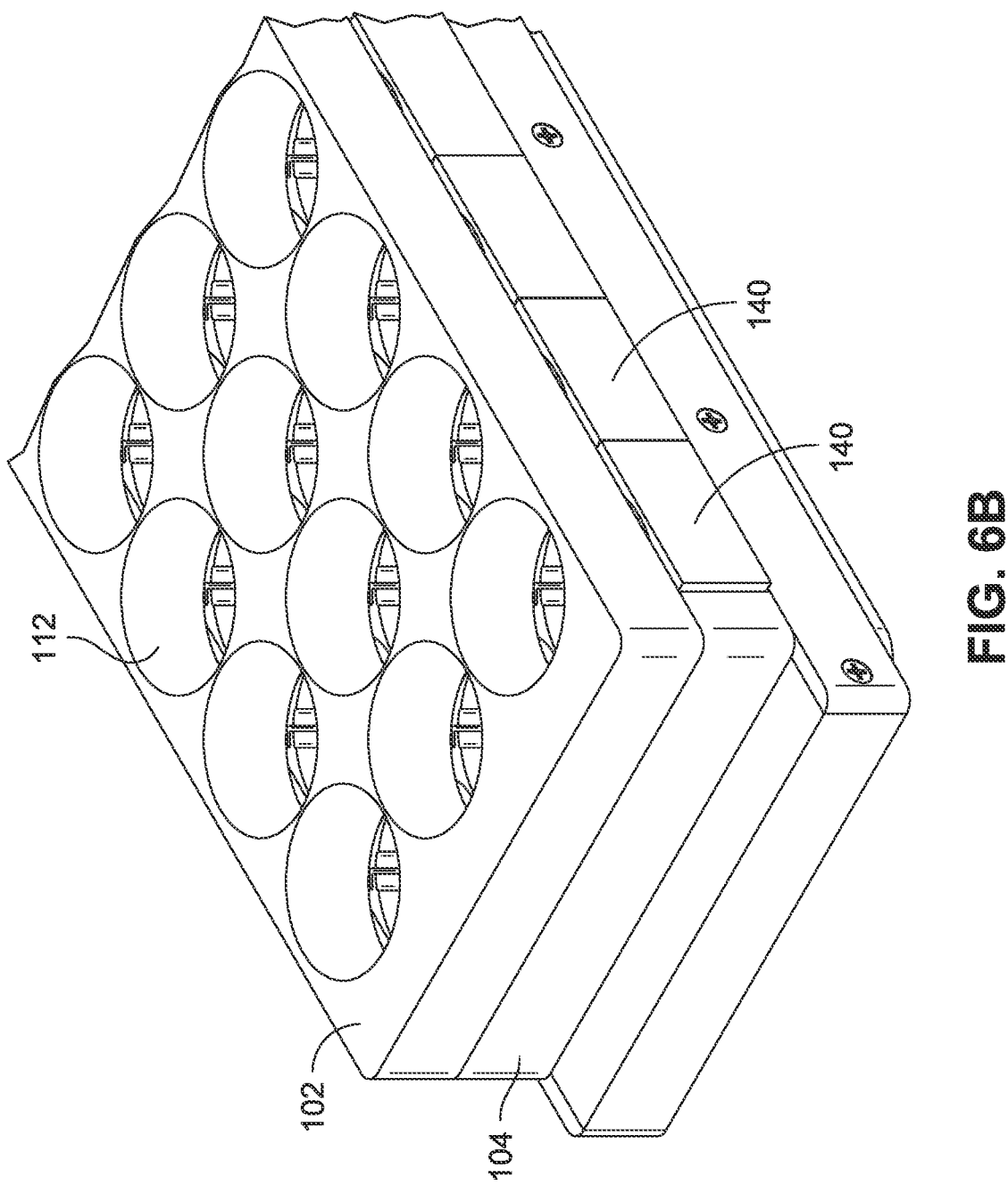
FIG. 6B is an isometric view of the sample rack with the sample vessel stabilizer of FIG. 6A, shown in a locked orientation in accordance with an example embodiment of the present disclosure.

In implementations, the sample rack 102 can include a single slidable support structure 140 to transition the entire sample rack 102 between the load/unload state and the lock state or a plurality of slidable support structures 140 to transition one or more sections of the sample rack 102 between the load/unload state and the lock state (e.g., as shown in FIGS. 6A and 6B). For example, the plurality of slidable support structures 140 can control the state of the sample rack 102 to provide locking or access to a single row, multiple rows, a single column, multiple columns, or other configurations of the apertures 112 of the sample rack 102.

Figure 7A:
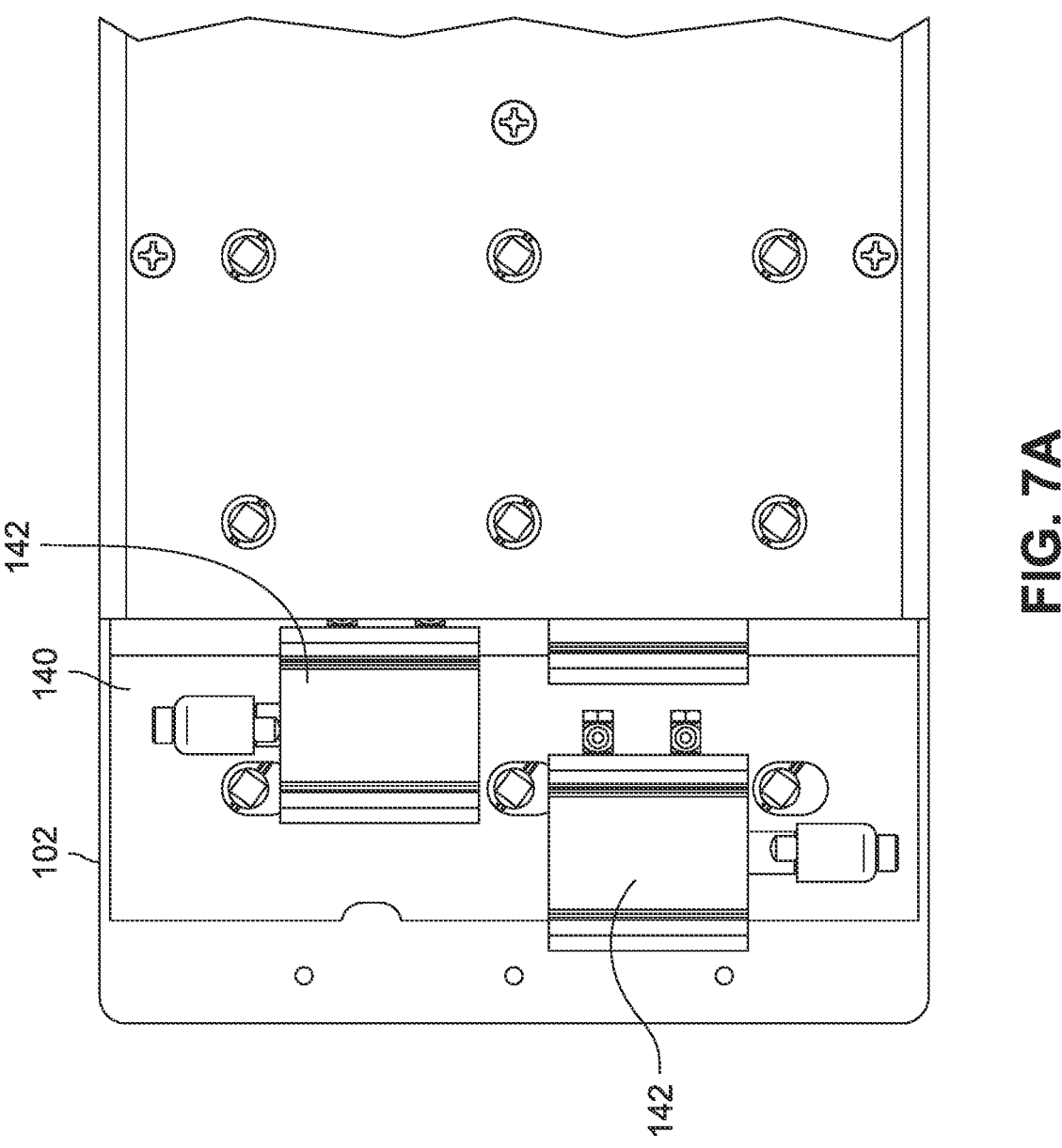
FIG. 7A is a partial bottom view of the sample rack with the sample vessel stabilizer of FIG. 6A, shown with pneumatic actuators for sliding portions of the sample rack between load/unload orientations and locked orientations.
Figure 7B:
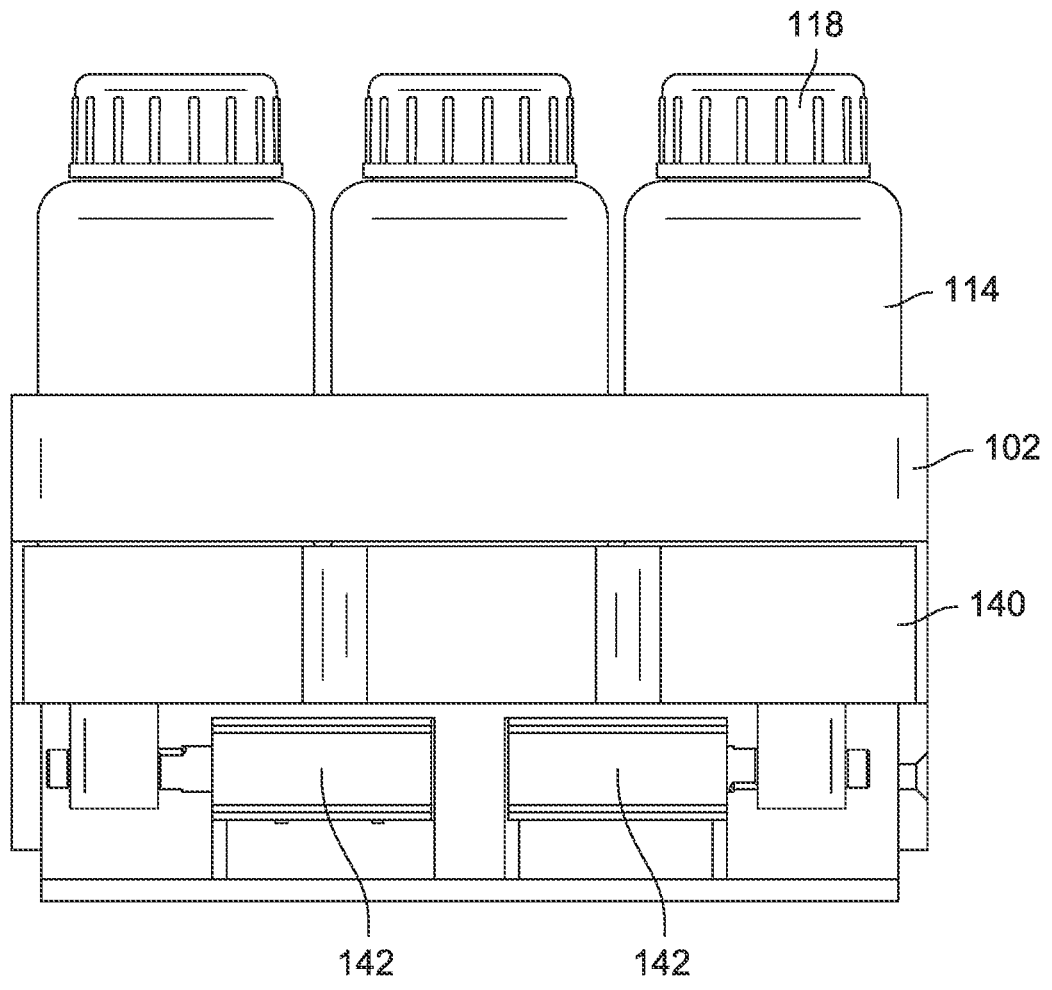
FIG. 7B is a partial end view of the sample rack with the sample vessel stabilizer of FIG. 6A.

In implementations, the sample rack 102 includes one or more pistons 142 (e.g., pneumatically-driven pistons, electrically-driven pistons, etc.), examples of which are shown in FIGS. 7A and 7B, to push the slidable support structure 140 or individual pieces of the slidable support structure 140 relative to the sample rack 102 to transition the sample rack 102 between the load/unload state and the lock state. For example, the sample rack 102 can include a first piston 142 to push the slidable support structure 140 or individual pieces of the slidable support structure 140 in a first direction and can include a second piston 142 to push the slidable support structure 140 or individual pieces of the slidable support structure 140 in a second direction (e.g., opposite the first direction) to control positioning of the slidable support structure 140 relative to the sample rack 102. While the system 100 is shown with pistons 142 used to manipulate operation of the sample vessel stabilizer 104, the system 100 is not limited to use of pistons and can include other structures (e.g., mechanical, electromechanical, magnetic, or otherwise) to provide stability to the sample vessel 114 during removal or addition of the cap 118 without departing from the scope of the present disclosure.

Electromechanical devices (e.g., electrical motors, servos, actuators, or the like) may be coupled with or embedded within the components of the system 100 to facilitate automated operation via control logic embedded within or externally driving the system 100. The electromechanical devices can be configured to cause movement of devices and fluids according to various procedures, such as the procedures described herein. The system 100 may include or be controlled by a computing system having a processor or other controller configured to execute computer readable program instructions (i.e., the control logic) from a non-transitory carrier medium (e.g., storage medium such as a flash drive, hard disk drive, solid-state disk drive, SD card, optical disk, or the like). The computing system can be connected to various components of the system 100, either by direct connection, or through one or more network connections (e.g., local area networking (LAN), wireless area networking (WAN or WLAN), one or more hub connections (e.g., USB hubs), and so forth). For example, the computing system can be communicatively coupled to the system controller 110, the first carriage 126, the second carriage 136, fluid handling systems (e.g., valves, pumps, etc.), other components described herein, components directing control thereof, or combinations thereof. The program instructions, when executed by the processor or other controller, can cause the computing system to control the system 100 (e.g., control positioning of the uncapper 106 and the sample probe 108, control movement of fluids via the sample probe, etc.) according to one or more modes of operation, as described herein.

It should be recognized that the various functions, control operations, processing blocks, or steps described throughout the present disclosure may be carried out by any combination of hardware, software, or firmware. In some embodiments, various steps or functions are carried out by one or more of the following: electronic circuitry, logic gates, multiplexers, a programmable logic device, an application-specific integrated circuit (ASIC), a controller/microcontroller, or a computing system. A computing system may include, but is not limited to, a personal computing system, a mobile computing device, mainframe computing system, workstation, image computer, parallel processor, or any other device known in the art. In general, the term "computing system" is broadly defined to encompass any device having one or more processors or other controllers, which execute instructions from a carrier medium.

Program instructions implementing functions, control operations, processing blocks, or steps, such as those manifested by embodiments described herein, may be transmitted over or stored on carrier medium. The carrier medium may be a transmission medium, such as, but not limited to, a wire, cable, or wireless transmission link. The carrier medium may also include a non-transitory signal bearing medium or storage medium such as, but not limited to, a read-only memory, a random access memory, a magnetic or optical disk, a solid-state or flash memory device, or a magnetic tape.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An autosampler system comprising:
   a sample rack;
   a sample vessel stabilizer configured to transition the sample rack between a load/unload state and a lock state;
   an uncapper supported by a first z-axis support;

a sample probe supported by a second z-axis support, wherein the uncapper is configured to remove a cap from a sample vessel held by the sample rack when the sample rack is in the lock state, and wherein the uncapper is configured to change the position of the removed cap to permit access to an interior of the sample vessel by the sample probe without removing the sample vessel from the sample rack;
   a motor system configured to provide at least rotational motion and translational motion to each of the first z-axis support and the second z-axis support; and
   a deck configured to support at least a portion of the sample rack on top of the deck, the deck defining at least one channel through which the first z-axis support and the second z-axis support are configured to pass during translational motion.

2. The autosampler system of claim 1, wherein the motor system includes a first carriage coupled to the first z-axis support and configured to provide rotational motion and translational motion to the first z-axis support to move the uncapper.

3. The autosampler system of claim 2, wherein the motor system includes a second carriage coupled to the second z-axis support and configured to provide rotational motion and translation translational motion to the second z-axis support to move the sample probe.

4. The autosampler system of claim 1, wherein the deck defines a common channel through which each of the first z-axis support and the second z-axis support is configured to pass during translational motion.

5. The autosampler system of claim 1, wherein the uncapper includes an uncapper body and a cap interface rotationally coupled to the uncapper body, wherein the uncapper body is coupled to the first z-axis support, and wherein the cap interface is configured to rotate about a rotational axis separate from the first z-axis support.

6. The autosampler system of claim 5, wherein the uncapper body supports a motor configured to rotate the cap interface relative to the uncapper body to impart motion to the cap.

7. The autosampler system of claim 5, wherein the cap interface includes a vacuum structure configured to draw a vacuum against the removed cap when the cap interface receives at least a portion of the cap into an interior region of the cap interface.

8. The autosampler system of claim 7, wherein the vacuum structure includes a vacuum sensor configured to register at least one of the presence or absence of the cap relative to the cap interface.

9. The autosampler system of claim 8, wherein the vacuum sensor is configured to generate a signal indicative of a status of the cap, and where the autosampler system is configured to move the sample probe responsive to the signal.

10. The autosampler system of claim 1, wherein the sample rack includes a first plurality of apertures into which the sample vessel is received, and wherein the sample vessel stabilizer includes a second plurality of apertures to receive the sample vessel.

11. The autosampler system of claim 10, wherein the first plurality of apertures is aligned with the second plurality of apertures when the sample vessel stabilizer is in the load/unload state, and wherein the first plurality of apertures is partially offset from the second plurality of apertures when the sample vessel stabilizer is in the lock state.

12. An autosampler system comprising:
   a sample rack;

a sample vessel stabilizer configured to transition the sample rack between a load/unload state and a lock state;

an uncapper supported by a first z-axis support, the uncapper including an uncapper body and a cap interface rotationally coupled to the uncapper body, the uncapper body coupled to the first z-axis support;

a sample probe supported by a second z-axis support;

a motor system configured to provide at least rotational motion and translational motion to each of the first z-axis support and the second z-axis support, wherein the uncapper is configured to remove a cap from a sample vessel held by the sample rack via interaction between the cap interface and the cap when the sample rack is in the lock state, and wherein the uncapper is configured to change the position of the removed cap via rotational motion of the uncapper body to permit access to an interior of the sample vessel by the sample probe without removing the sample vessel from the sample rack; and a deck configured to support at least a portion of the sample rack on top of the deck, the deck defining at least one channel through which the first z-axis support and the second z-axis support are configured to pass during translational motion, wherein the cap interface is configured to rotate about a rotational axis separate from the first z-axis support.

13. The autosampler system of claim 12, wherein the motor system includes a first carriage coupled to the first z-axis support and configured to provide rotational motion and translational motion to the first z-axis support to move the uncapper, and wherein the motor system includes a second carriage coupled to the second z-axis support and configured to provide rotational motion and translational motion to the second z-axis support to move the sample probe.

14. The autosampler system of claim 12, wherein the deck defines a common channel through which each of the first z-axis support and the second z-axis support is configured to pass during translational motion.

15. The autosampler system of claim 12, wherein the uncapper body supports a motor configured to rotate the cap interface relative to the uncapper body to impart motion to the cap.

16. The autosampler system of claim 12, wherein the cap interface includes a vacuum structure configured to draw a vacuum against the removed cap when the cap interface receives at least a portion of the cap into an interior region of the cap interface.

17. The autosampler system of claim 16, wherein the vacuum structure includes a vacuum sensor configured to register at least one of the presence or absence of the cap relative to the cap interface, and wherein the vacuum sensor is configured to generate a signal indicative of a status of the cap, and where the autosampler system is configured to move the sample probe responsive to the signal.

* * * * *